:05

(12) United States Patent
Mitsutake

(10) Patent No.: US 8,499,647 B2
(45) Date of Patent: *Aug. 6, 2013

(54) ELECTROMAGNETIC FLOW METER

(75) Inventor: Ichirou Mitsutake, Tokyo (JP)

(73) Assignee: Azbil Corporation, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 13/091,364

(22) Filed: Apr. 21, 2011

(65) Prior Publication Data

US 2011/0259118 A1    Oct. 27, 2011

(30) Foreign Application Priority Data

Apr. 27, 2010  (JP) ................................. 2010-101822

(51) Int. Cl.
*G01F 1/56* (2006.01)
(52) U.S. Cl.
USPC ...................................................... 73/861.08
(58) Field of Classification Search
USPC ...................................................... 73/861.08
See application file for complete search history.

(56) References Cited

U.S. PATENT DOCUMENTS

| 4,181,019 | A | 1/1980 | Kobayashi et al. |
|---|---|---|---|
| 4,290,313 | A | 9/1981 | Appel et al. |
| 4,303,980 | A | 12/1981 | Yard |
| 4,644,799 | A | 2/1987 | Tomita |
| 4,658,653 | A | 4/1987 | Tomita |
| 4,672,331 | A | 6/1987 | Cushing |
| 4,709,583 | A | 12/1987 | De Paepe et al. |
| 4,773,274 | A | 9/1988 | Kobayashi et al. |
| 5,388,465 | A | 2/1995 | Okaniwa et al. |
| 5,443,552 | A | 8/1995 | Tomita |
| 5,621,177 | A | 4/1997 | Torimaru |
| 6,845,330 | B2 * | 1/2005 | Okuda et al. ................... 702/38 |
| 2004/0035180 | A1 | 2/2004 | Okuda et al. |

FOREIGN PATENT DOCUMENTS

| GB | 2152220 | A | 7/1985 |
|---|---|---|---|
| GB | 2201785 | A | 9/1988 |
| JP | 6-258111 | A | 9/1994 |
| JP | 7-055519 | A | 3/1995 |
| JP | 7-324959 | A | 12/1995 |
| JP | 10-111157 | A | 4/1998 |
| JP | 2000-258211 | A | 9/2000 |
| JP | 2000-292230 | A | 10/2000 |

OTHER PUBLICATIONS

U.S. Appl. No. 13/089,418, Taka Inoue et al, Elelctromagnetic flow meter, Apr. 19, 2011.*

* cited by examiner

*Primary Examiner* — Jewel V Thompson
(74) *Attorney, Agent, or Firm* — Troutman Sanders LLP

(57) ABSTRACT

A noise eliminating circuit is provided between a sample hold portion and an A/D converting portion. In the noise eliminating circuit, a DC flow rate signal is sent from the sample hold portion through a buffer to one input terminal of an operational amplifier as a first input signal, and through a high-pass filter and a buffer to the other input terminal of the operational amplifier as a second input signal. The high-pass filter passes, as a noise component, a signal of higher than a specific frequency included in the DC flow rate signal. The operational amplifier calculates the difference between the first input signal (the flow rate signal component+the noise component) and the second input signal (the noise component), and outputs this difference (the flow rate signal component) to the A/D converting portion as the DC flow rate signal.

2 Claims, 4 Drawing Sheets

(a) Magnetic Excitation Signal 9B (b) AC Flow Rate Signal 1A (c) Switch 31S (d) Switch 32S (e) DC Flow Rate Signal 3A

ELECTROMAGNETIC FLOW METER

CROSS REFERENCE TO RELATED APPLICATIONS

The present application claims priority under 35 U.S.C, §119 to Japanese Patent Application No. 2010-101822, filed Apr. 27, 2010, which is incorporated herein by reference

FIELD OF TECHNOLOGY

The present invention relates to an electromagnetic flow meter for measuring a flow rate of a fluid having electrical conductivity in various types of process systems.

BACKGROUND OF THE INVENTION

Conventionally, in this type of electromagnetic flow meter, an AC excitation current Iex is supplied to an excitation coil that is disposed so that the direction wherein the magnetic field thereof is produced is perpendicular to the direction of flow of a fluid flowing within a measuring tube, and an electric signal that includes a signal EMF that is produced between a pair of electrodes that are disposed within the measuring tube, perpendicular to the magnetic field that is produced by the excitation coil, is detected as an AC current signal, and this detected AC current signal is sampled and subjected to signal processing to produce a measured flow rate.

FIG. 3 is a illustrates schematically a conventional electromagnetic flow meter. In this figure: 10 is a detecting device for applying a magnetic field to a fluid that flows within a measuring tube 10C based on the AC magnetic excitation electric current Iex, and detecting and outputting, as an AC flow rate signal, an electric signal that includes a signal EMF that is produced in the fluid; and 11 is a converting device for not only outputting the magnetic excitation electric current Iex to the detecting device 10, but also performing signal processing on the AC flow rate signal from the detecting device 10 to calculate and output the flow rate of the fluid flowing within the measuring tube 10C.

In this electromagnetic flow meter, the magnetic excitation portion 8 of the converting device 11 outputs a square wave AC magnetic excitation electric current Iex of a specific frequency based on a magnetic excitation signal 9B from a switching portion 9. A magnetic excitation coil 10D of the detecting device 10 is magnetically excited by the AC magnetic excitation electric current iIex from the converting device 11, to apply a specific magnetic field to the fluid that flows within the measuring tube 10C, to thereby produce a signal EMF having an amplitude that is dependent on the flow speed of the fluid. Additionally, an electric signal including the signal EMF is detected by the electrodes 10A and 10B, and outputted to the converting device 11 as an AC flow rate signal.

In the converting device 11, in an AC amplifying portion 1, the AC flow rate signal from the detecting device 10 is amplified, and outputted as an amplified AC flow rate signal 1A. In a sample hold portion 3, the positive side and the negative side of the AC flow rate signal 1A from the AC amplifying portion 1 are both sampled, through switches 31S and 32S of sampling circuits 31 and 32 being controlled based on a sampling signal 9A from the switching portion 9, to be outputted from an operational amplifier 33 as a DC flow rate signal 3A.

The DC flow rate signal 3A that is outputted from the sample hold portion 3 is converted into a digital signal by an A/D converting portion 5. A calculating/processing portion 6 accepts the digital signal from the A/D converting portion 5 and calculates the desired measured flow rate value through performing specific calculation processes, and, in an outputting portion 7, converts into a specific signal, which is outputted.

FIG. 4 is a timing chart illustrating the sampling operation for the electromagnetic flow meter illustrated in FIG. 3, wherein: FIG. 4 (a) is the magnetic excitation signal 9B from the switching portion 9; FIG. 4 (b) is the AC flow rate signal 1A outputted to the sample hold portion 3; FIG. 4 (c) is the switching operation of the switch 31S that operates based on the sampling signal 9A from the switching portion 9; FIG. 4 (d) is the switching operation of the switch 32S that operates based on the sampling signal 9A from the switching portion 9; and FIG. 4 (e) is the DC flow rate signal 3A that is outputted from the sample hold portion 3.

In this case, the sampling intervals by the switches 31S and 32S (the intervals indicated by the diagonal lines in FIG. 4 (b)) are established in the vicinity of the ends of each pulse of the magnetic excitation signals 9B (the AC flow rate signals 1A) in consideration of the stability of the waveform, and in the sample hold portion 3, the switches 31S and 32S are each ON during only the sampling intervals, to integrate and output the AC flow rate signals 1A as the DC flow rate signal 3A.

In this electromagnetic flow meter, there are many types of noises, such as spike noise and low-frequency noise, as noises that are mixed in from the electrodes 10A and 10B. In particular, the impact of the spike noise is remarkable, and ignoring the spike noise may lead to a decrease in measurement accuracy.

In order to eliminate the impact of the spike noise in, for example, the electromagnetic flow meter disclosed in Japanese Unexamined Patent Application Publication 2000-292230, a noise eliminating circuit for eliminating the spike noise is provided between the AC amplifying device 1 and the sample hold portion 3.

However, in a structure wherein the noise eliminating circuit is disposed between the AC amplifying device 1 and the sample hold portion 3, if noise incurs between the sample hold portion 3 and the AD converting portion 5, then it will not be possible to eliminate the noise that has incurred.

The present invention was created in order to solve the problem as set forth above, and the object thereof is to provide an electromagnetic flow meter able to eliminate noise that incurs between the sample hold portion and the A/D converting portion.

SUMMARY OF THE INVENTION

In order to achieve such an object, the present example is an electromagnetic flow meter having a magnetic excitation coil arranged so that the direction in which the magnetic field thereof is produced is perpendicular to the direction of flow of a fluid flowing within a measuring tube; magnetic excitation device for providing an AC magnetic excitation current to the magnetic excitation coil; a pair of electrodes disposed within the measuring tube perpendicular to the direction of flow of the fluid flowing within the measuring tube and to the direction of the magnetic field produced by the magnetic excitation coil; detector for detecting an AC flow rate signal that includes a signal EMF produced between the electrodes; amplifier for amplifying the AC flow rate signal detected by the detector; sampler for sampling the AC flow rate signal that has been amplified by the amplifier, to produce a DC flow rate signal; and A/D converter for converting into a digital signal the DC flow rate signal from the sampler.

Further, noise eliminator for eliminating a noise component included in the DC flow rate signal to the A/D converter are provided between the sampler and the A/D converter.

The noise eliminator comprises a noise component extractor for extracting only a noise component included in the DC flow rate signal from the sampler; and output device for outputting, as a DC flow rate signal to the A/D converter, the difference between a first input signal and a second input signal, where the DC flow rate signal from the sampler is defined as the first input signal and the noise component extracted by the noise component extractor is defined as the second input signal.

In the present invention, the noise eliminator output, as a DC flow rate signal to the A/D converter, the difference between a first input signal and a second input signal, where the DC flow rate signal from the sampler is defined as the first input signal and the noise component extracted by the noise component extractor is defined as the second input signal. Doing so subtracts the second input signal (the noise component) from the first input signal (the flow rate signal component+the noise component), so that only the flow rate signal component is outputted, as the DC flow rate signal, to the A/D converter.

Given the present invention, noise eliminator for eliminating the noise component included in the DC flow rate signal to the A/D converter are provided between the sampler and the A/D converter, and thus only the flow rate signal component is outputted as the DC flow rate signal to the A/D converter, making it possible to eliminate not only the spike noise that incurs from the electrodes, but also noise that incurs between the sample hold portion and the A/D converting portion.

DETAILED DESCRIPTION OF THE INVENTION

The present invention will be explained in detail below.

Figure 1:
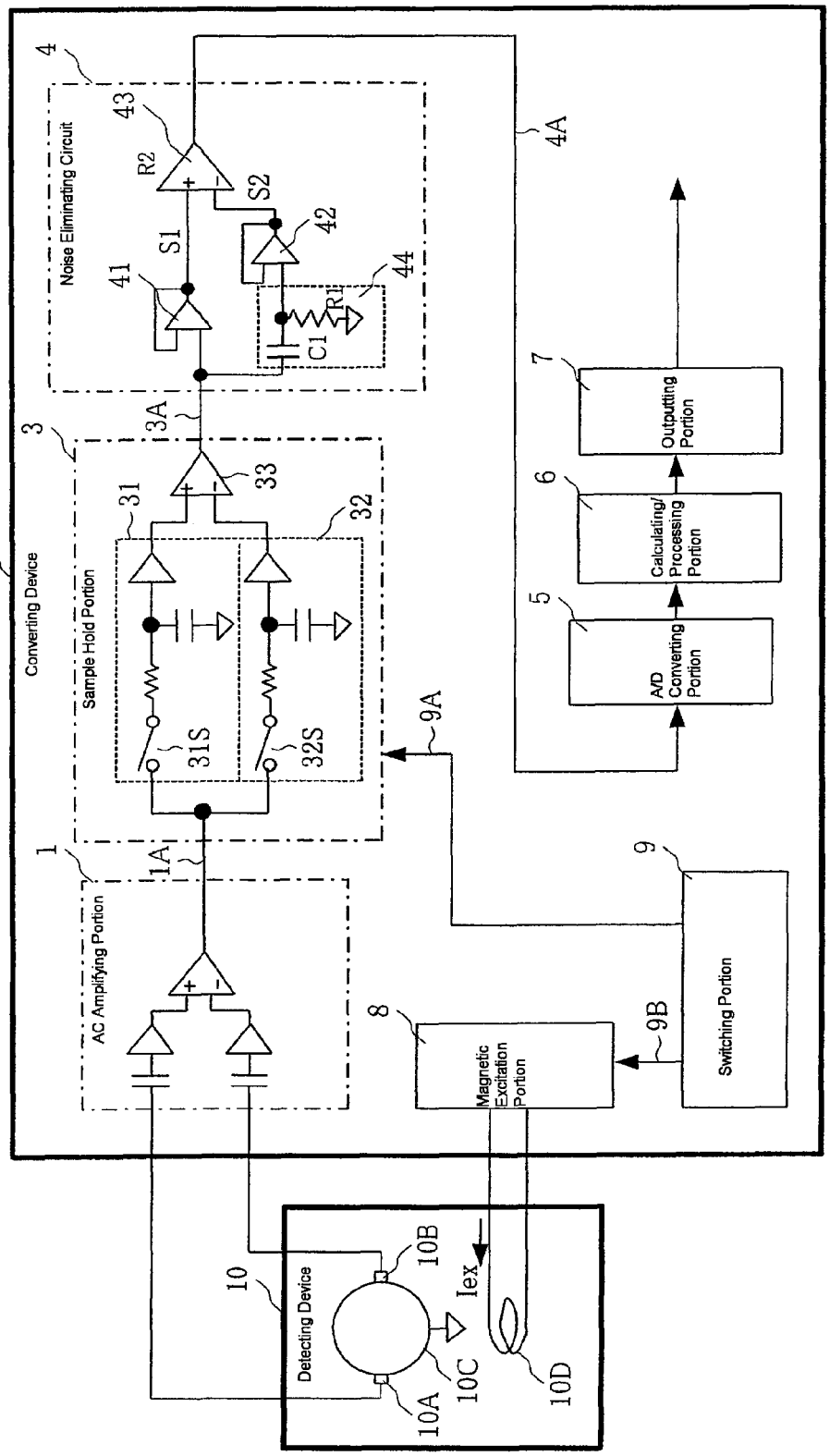
FIG. 1 is a diagram illustrating the main components of an example of an electromagnetic flow meter according to the present invention.
Figure 3:
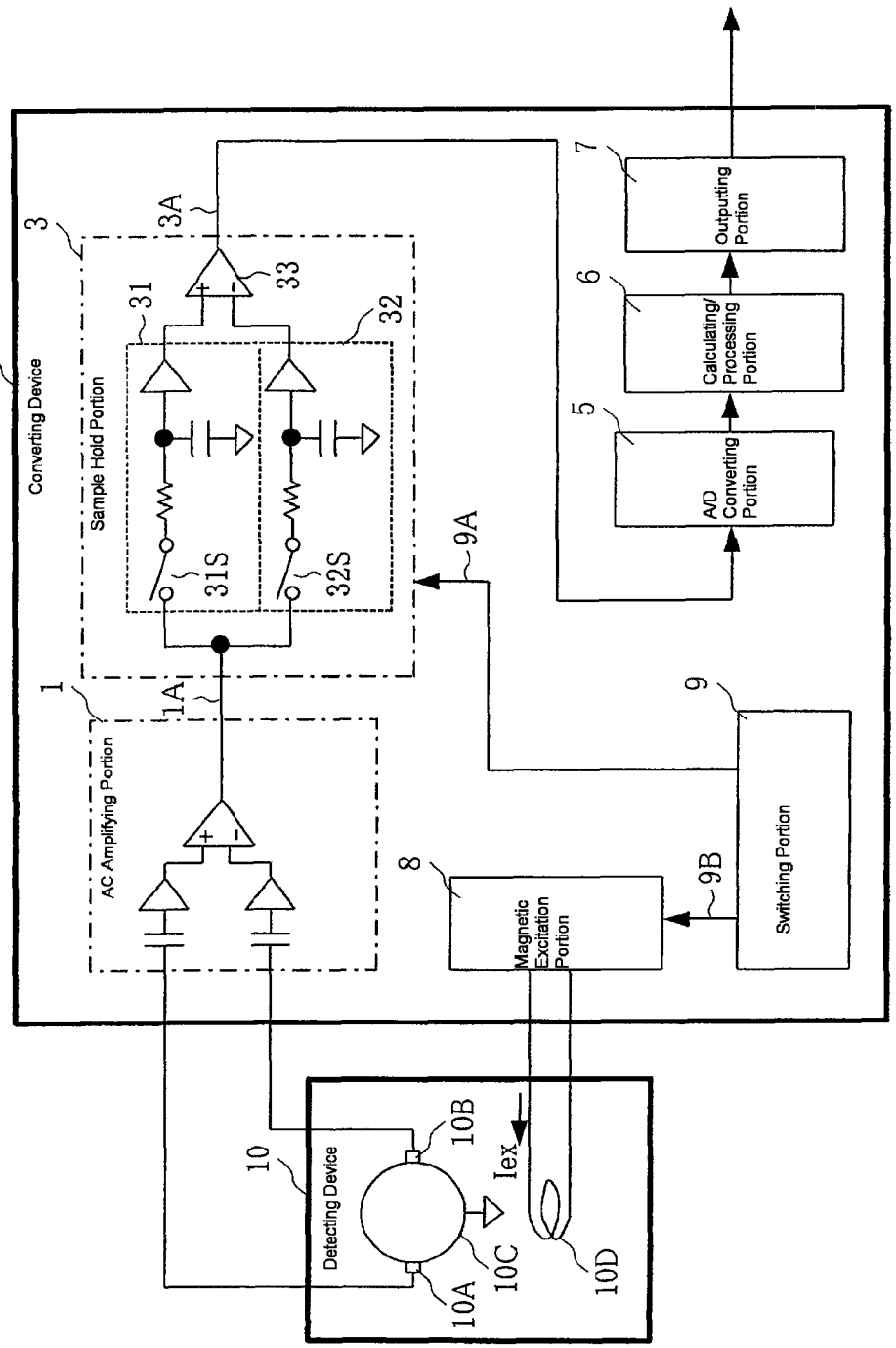
FIG. 3 is a diagram illustrating the main components of a conventional electromagnetic flow meter.
Figure 4:
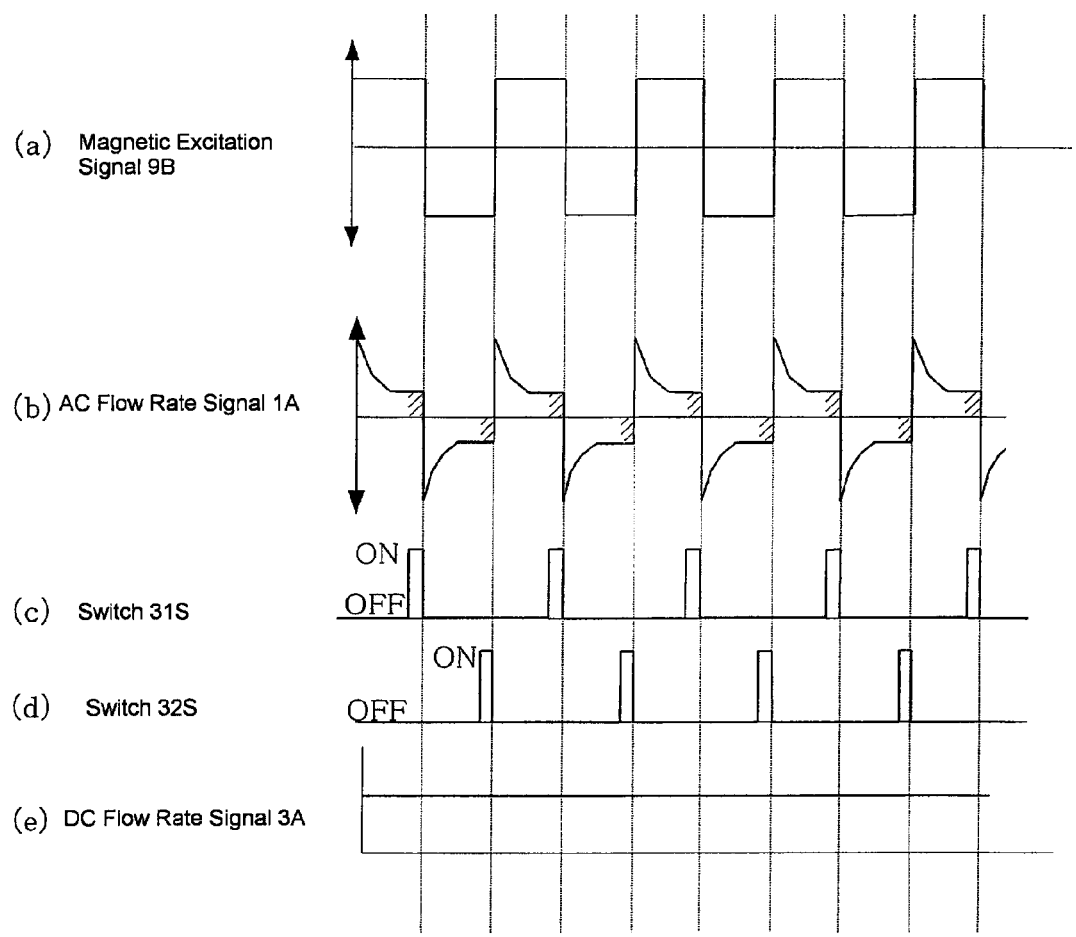
FIG. 4 is a timing chart illustrating the sampling operation of the electromagnetic flow meter.

FIG. 1 is a diagram illustrating the main components in an example of an electromagnetic flow meter according to the present invention. in this figure, codes that are the same as those in FIG. 3 indicate identical or equivalent structural elements as the structural elements explained in reference to FIG. 3, and explanations thereof are omitted, The point of difference of the electric magnetic flow meter in the present example from the conventional electromagnetic flow meter illustrated in FIG. 3 is the point wherein a noise eliminating circuit 4 is provided between the sample hold portion 3 and the AID converting portion 5 (immediately prior to the A/D converting portion 5). This noise eliminating circuit 4 is provided with buffers 41 and 42, an operational amplifier 43, a capacitor C1, and a resistance R1.

In the noise eliminating circuit 4, the buffer 41 inputs, as a first input signal S1, the DC flow rate signal 3A from the sample hold portion 3 into the input terminal (the positive polarity input terminal) of the operational amplifier 43. The capacitor C1 and the resistance R1 structure a high-pass filter 44, where the noise component of a signal above a specific frequency, included in the DC flow rate signal 3A from the sample hold portion 3, passes through and the noise component that has passed through is inputted into the other input terminal (the negative polarity input terminal) of the operational amplifier 43 as the second input signal S2.

In this example, the specific frequency at the high-pass filter 44 is set as a frequency of a value that is able to eliminate all of the flow rate signal component included in the DC flow rate signal 3A from the sample hold portion 3. Setting this frequency to a value that is extremely close to the DC component makes it possible to increase the performance of the noise removal of the noise eliminating circuit 4. In this noise eliminating circuit 4, the high-pass filter 44 corresponds to the noise component extractor in the present invention, and the operational amplifier 43 corresponds to the output device in the present invention. Additionally, the noise eliminating circuit 4 corresponds to the noise eliminator in the present invention.

As with the conventional electromagnetic flow meter, in this electromagnetic flow meter, the magnetic excitation portion 8 of the converting device 11 outputs a square wave AC magnetic excitation electric current Iex of a specific frequency based on a magnetic excitation signal 9B from a switching portion 9. A magnetic excitation coil 10D of the detecting device 10 is magnetically excited by the AC magnetic excitation electric current Iex from the converting device 11, to apply a specific magnetic field to the fluid that flows within the measuring tube 10C, to thereby produce a signal EMF having an amplitude that is dependent on the flow speed of the fluid. Additionally, an electric signal including the signal EMF is detected by the electrodes 10A and 10B, and outputted to the converting device ill as an AC flow rate signal.

In the converting device 11, in an AC amplifying portion 1, the AC flow rate signal from the detecting device 10 is amplified, and outputted as an amplified AC flow rate signal 1A. In a sample hold portion 3, the positive side and the negative side of the AC flow rate signal 1A from the AC amplifying portion 1 are both sampled, through switches 31S and 32S of sampling circuits 31 and 32 being controlled based on a sampling signal 9A from the switching portion 9, to be outputted from an operational amplifier 33 as a DC flow rate signal 3A.

The DC flow rate signal 3A outputted from the sample hold portion 3 is sent to the noise eliminating circuit 4. In the noise eliminating circuit 4, the DC flow rate signal 3A from the sample hold portion 3 is sent to the buffer 41 and the high-pass filter 44.

The buffer 41 sends the DC flow rate signal 3A from the sample hold portion 3 to one of the input terminals of the operational amplifier 43 as the first input signal S1, and the high-pass filter 44 passes, as a noise component, the signals higher than the specific frequency that are included within the DC flow rate signal 3A from the sample hold portion 3, and this passed noise component is inputted into the other terminal of the operational amplifier 43, through the buffer 42, as the second input signal S2.

The operational amplifier 43 calculates the difference between the first input signal S1 sent from the buffer 41, and the second input signal S2, sent from the high-pass filter 44, and outputs this difference to the A/D converting portion 5 as the DC flow rate signal 4A. In this case, the second input signal S2 (the noise component) is subtracted from the first input signal S1 (the flow rate signal component+the noise component) by the operational amplifier 43.

In this way, in the present example, only the flow rate signal component is outputted, as the DC flow rate signal 4A, to the A/D converting portion 5, eliminating not only the spike noise that incurs from the electrodes 10A and 10B, but also noise that incurs between the sample hold portion 3 and the A/D converting portion 5.

The DC flow rate signal 4A that is outputted from the noise eliminating circuit 4 is converted into a digital signal by the A/D converting portion 5. A calculating/processing portion 6 accepts the digital signal from the A/D converting portion 5 and calculates the desired measured flow rate value through performing specific calculation processes, and, in an outputting portion 7, converts into a specific signal, which is outputted.

Figure 2:
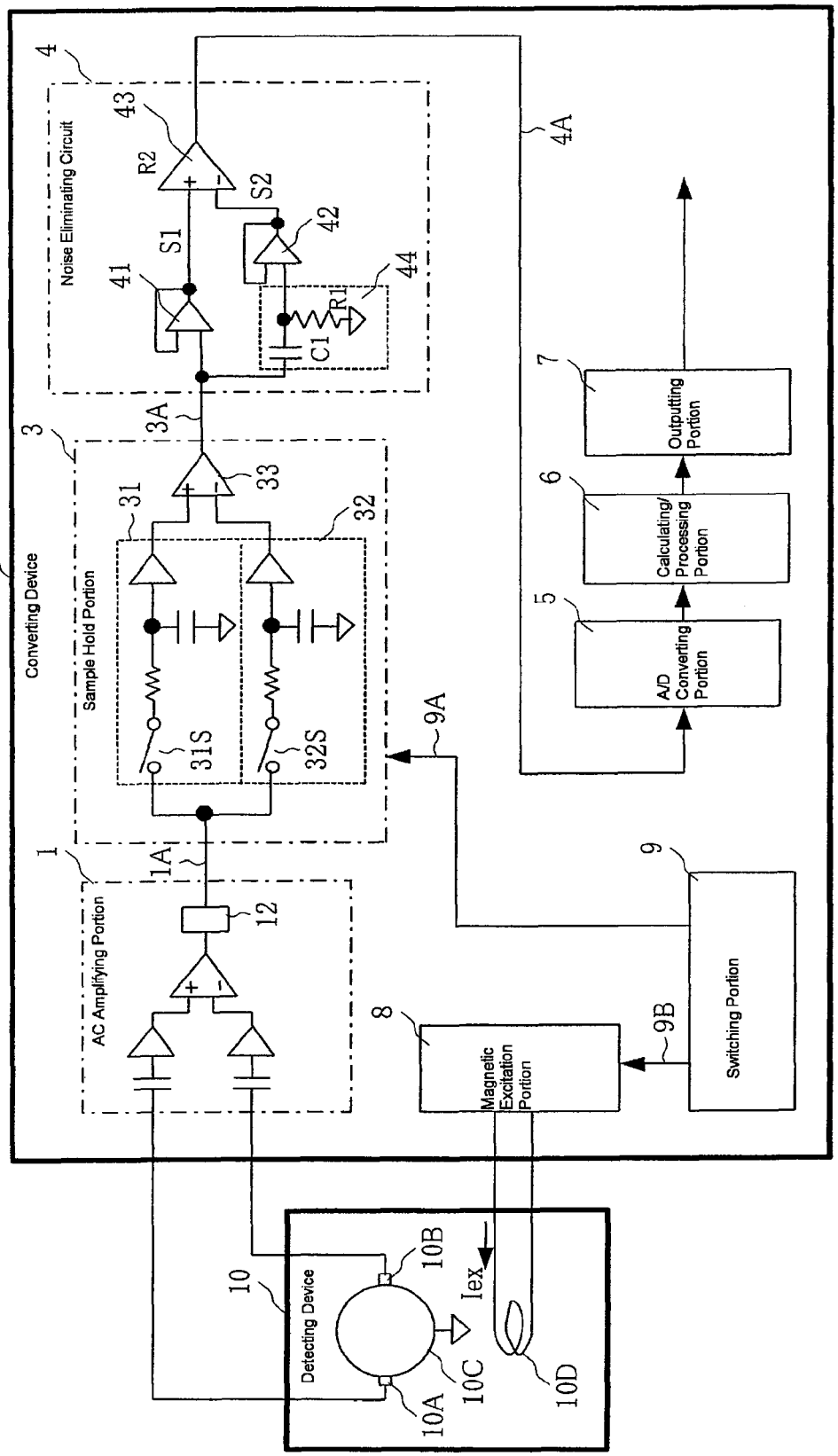
FIG. 2 is a diagram illustrating the main components of another example of an electromagnetic flow meter according to the present invention.

Note that, as illustrated in FIG. 2, the low-frequency noise that incurs into the detection signal may be suppressed through the provision of the high-pass filter 12 in the AC amplifying portion 1 to attenuate the tow frequency component from the detection signal obtained from the detecting device 10.

The electromagnetic flow meter according to the present invention can be used in a variety of process systems as an electromagnetic flow meter for measuring the flow rate of a fluid having electrical conductivity.

The invention claimed is:

1. An electromagnetic flow meter comprising:
 a magnetic excitation coil arranged so that the direction in which the magnetic field thereof is produced is perpendicular to the direction of flow of a fluid flowing within a measuring tube;
 a magnetic excitation device providing an AC magnetic excitation current to the magnetic excitation coil;
 a pair of electrodes disposed within the measuring tube perpendicular to the direction of flow of the fluid flowing within the measuring tube and to the direction of the magnetic field produced by the magnetic excitation coil;
 a detector detecting an AC flow rate signal that includes a signal EMF produced between the electrodes;
 an amplifier amplifying the AC flow rate signal detected by the detector;
 a sampler sampling the AC flow rate signal that has been amplified by the amplifier, to produce a DC flow rate signal; an A/D converter converting into a digital signal the DC flow rate signal from the sampler; and
 a noise eliminator eliminating a noise component included in the DC flow rate signal to the A/D converter is provided between the sampler and the A/D converter, and comprising:
  a noise component extractor extracting only a noise component included in the DC flow rate signal from the sampler; and
  an output device outputting, as a DC flow rate signal to the A/D converter, the difference between a first input signal and a second input signal, where the DC flow rate signal from the sampler is defined as the first input signal and the noise component extracted by the noise component extractor is defined as the second input signal.

2. The electromagnetic flow meter as set forth in claim 1, wherein the noise component extractor comprises:
 a high-pass filter passing as a noise component a signal of higher than a specific frequency included in the DC flow rate signal from the sampler.

\* \* \* \* \*